United States Patent [19]

Sakamoto

[11] Patent Number: 5,019,118
[45] Date of Patent: May 28, 1991

[54] BEARING STRUCTURE FOR TWO-CYCLE INTERNAL COMBUSTION ENGINE

[75] Inventor: Osamu Sakamoto, Hamamatsu, Japan

[73] Assignee: Sanshin Kogyo Kabushiki Kaisha, Hamamatsu, Japan

[21] Appl. No.: 372,675

[22] Filed: Jun. 28, 1989

[30] Foreign Application Priority Data

Jun. 29, 1988 [JP] Japan .................. 63-162158

[51] Int. Cl.⁵ .................. F16C 33/76; F16C 33/80
[52] U.S. Cl. .................. 123/196 W; 123/65 R; 384/482
[58] Field of Search ......... 123/195 HC, 196 W, 65 R, 123/73 R, 73 V; 384/480, 482, 484, 485, 486, 489

[56] References Cited

U.S. PATENT DOCUMENTS

| | | | |
|---|---|---|---|
| 3,414,275 | 12/1968 | Takahashi | 384/480 |
| 3,572,857 | 3/1971 | Hasegawa | 384/482 |
| 3,642,335 | 2/1972 | Takahashi et al. | 384/482 |
| 4,343,377 | 8/1982 | Tamba et al. | 123/196 R |
| 4,372,258 | 2/1983 | Iwai | 123/196 W |
| 4,493,661 | 1/1985 | Iwai | 123/196 W |
| 4,505,484 | 3/1985 | Ohkuma et al. | 384/482 |
| 4,599,979 | 7/1986 | Breckenfeld et al. | 123/196 W |
| 4,643,594 | 2/1987 | Neder et al. | 384/482 |
| 4,733,978 | 3/1988 | Colanzi et al. | 384/482 |
| 4,830,518 | 5/1989 | Shiratani et al. | 384/480 |
| 4,854,749 | 8/1989 | Kohigashi et al. | 384/482 |
| 4,865,471 | 9/1989 | Miyazaki | 384/482 |
| 4,890,587 | 1/1990 | Holtermann | 123/195 HC |

FOREIGN PATENT DOCUMENTS 61-135967 6/1986 Japan .

Primary Examiner—David A. Okonsky
Attorney, Agent, or Firm—Ernest A. Beutler

[57] ABSTRACT

A bearing for receiving a crankshaft positioned in a crankcase of an inboard/outboard internal combustion engine which includes a seal member for sealing the inside of the bearing so as to prevent corrosion of the bearing. Preferably, the crankcase includes a plurality of crank chambers to accommodate a crankshaft rotatably received by a plurality of bearings, each of which includes a seal member.

19 Claims, 2 Drawing Sheets

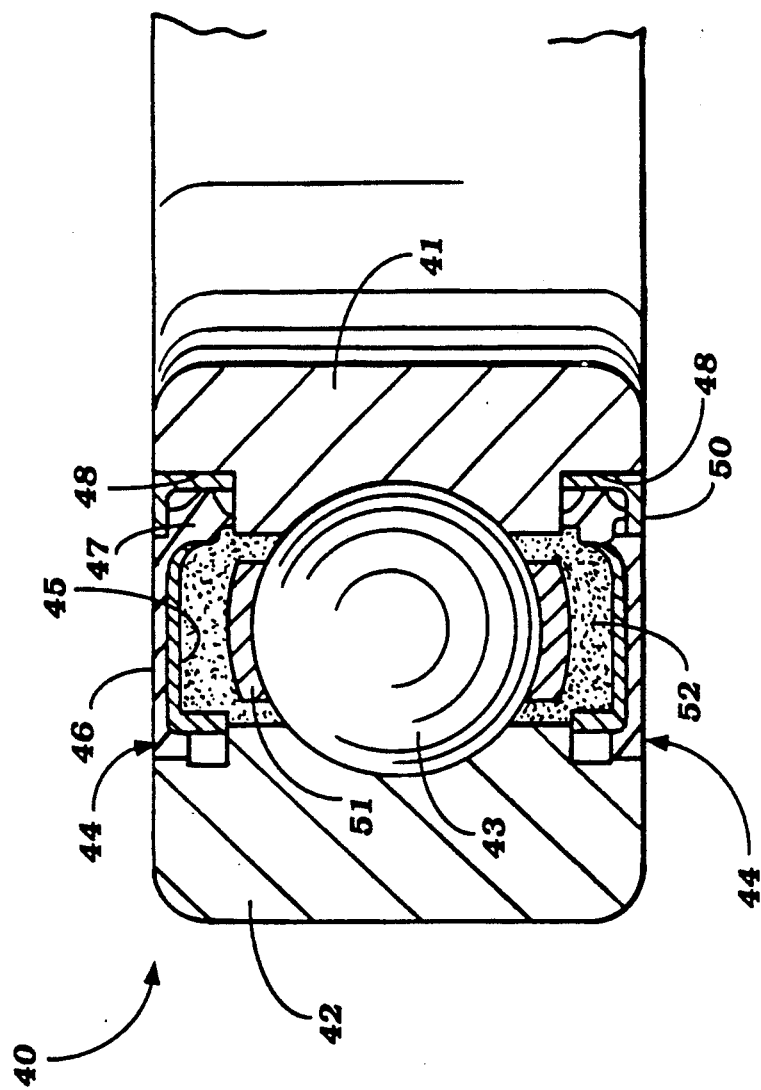

5,019,118

BEARING STRUCTURE FOR TWO-CYCLE INTERNAL COMBUSTION ENGINE

BACKGROUND OF THE INVENTION

This invention relates to a bearing for receiving a crankshaft positioned in a crankcase of a marine internal combustion engine. More particularly, the invention pertains to a seal member for sealing the inside of the bearing so as to prevent corrosion of the bearing.

During normal operation of a marine internal combustion engine, the induction air typically contains water which thus enters crank chambers formed within the crankcase, and within which a crankshaft is rotatably disposed. A labyrinth seal is typically used as an air seal between two adjacent crank chambers. Such a seal, however, is not intended to seal the bearings. As a result, the water causes the bearings to rust and thereby reduces their service life.

An object of this invention, therefore, is to provide an improved bearing structure including a seal member for sealing the inside of each bearing to prevent corrosion of the bearings.

Another object of this invention is to provide an improved bearing structure which eliminates the need of labyrinth seals so as to provide a more compact engine in the vertical dimension.

SUMMARY OF THE INVENTION

In a marine internal combustion engine, a seal member for sealing the inside of a crankshaft bearing so as to prevent corrosion of the bearing. The engine includes a crankcase having at least one crank chamber, at least one bearing, and a crankshaft rotatably journaled within the crankcase by the tearing. Preferably, the engine includes a plurality of crank chambers and a plurality of bearings positioned between adjacent crank chambers. Each tearing includes a seal member for sealing the inside of each tearing so as to prevent corrosion of the bearings.

Preferably, the bearing includes a plurality of inner and outer races between which a plurality of balls are supported. The seal member is preferably composed of an annular reinforcing substrate and a rubber layer which is bonded to the substrate. The rubber layer has a lip protruding from one side of the substrate which is in pressure contact with the surface of a stepped portion of the inner race to secure the seal member in position.

BRIEF DESCRIPTION OF THE DRAWINGS

FIG. 2 is an enlarged, cross-sectional view, cut away in part and parts shown in section, of a bearing.

DETAILED DESCRIPTION OF THE PREFERRED EMBODIMENTS

Figure 1:
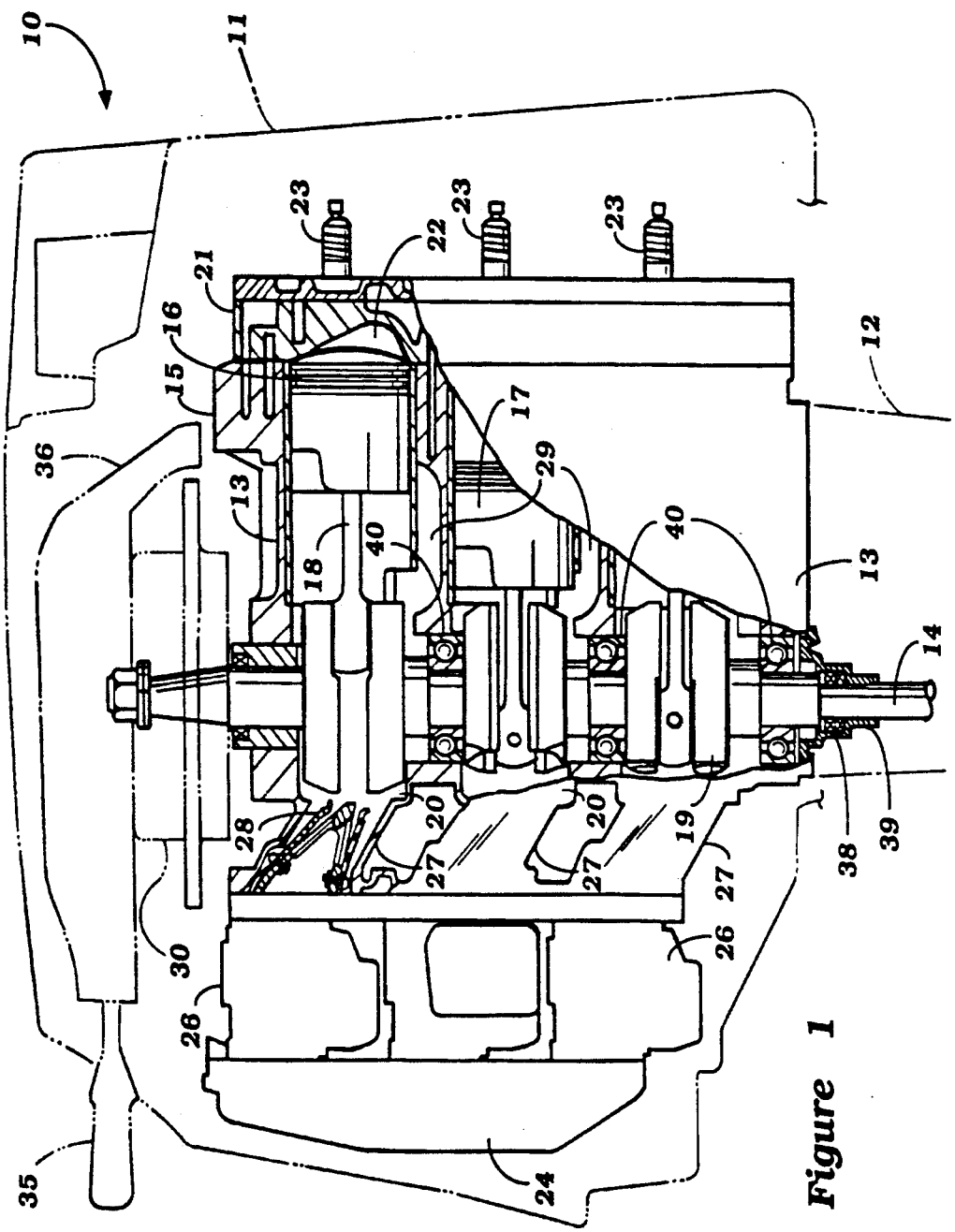
FIG. 1 is an elevational view, cut away in part and parts shown in cross-section, showing part of an internal combustion engine, including the crankshaft and its supporting structure.

FIG. 1 illustrates a power head 10 of an outboard drive unit and a portion of the drive shaft housing 12. The power head includes a protective cowling 11 and an internal combustion engine 13 which is depicted as being of the three cylinder, in line, crankcase compression, two-cycle type. It is to be understood, of course, that the invention may be utilized in conjunction with other types of engines than the two-cycle type and also engines having different numbers of cylinders and different cylinder configurations.

The engine 13 is positioned so that its output shaft rotates about a vertically extending axis. A drive shaft 14 driven by the output shaft extends into the drive shaft housing 12. This drive shaft 14 extends to a lower unit (not shown) so as to drive a propeller or other form of propulsion device in a known manner.

The engine 13 is comprised of a cylinder block 15 in which three cylinder bores 16 extend in a horizontal direction to slidably support a respective piston 17. Each piston 17 is connected by means of a respective connecting rod 18 to a crankshaft 19 which rotates about a generally vertically extending axis. The crankshaft 19 is connected to the output shaft which drives a drive shaft 14, as aforenoted.

In the preferred embodiment of the invention, the crankshaft 19 is rotatably journaled in a crankcase and rotatably received by a plurality of bearings 40, the details of which are illustrated in FIG. 2. As is conventional with two-cycle internal combustion engines, the crankcase forms a plurality of crank chambers 20, one for each cylinder bore 16. In the preferred embodiment, the bearings 40 are positioned between adjacent crank chambers 20 and one between the lowest crank chamber 20 and the drive shaft housing 12 to seal the chambers 20. However, the invention may be utilized in conjunction with engines having only one bearing and one crank chamber 20.

A cylinder head 21 is affixed to the cylinder block 15 in a known manner and defines three recesses each of which cooperates with a respective cylinder bore 16 and piston 17 so as to define combustion chambers 22 which vary in volume as the pistons 17 reciprocate. Spark plugs 23 are mounted in the cylinder head 21 with each of their gaps extending into the respective combustion chamber recess for the respective cylinder.

A fuel/air charge is delivered to the crank chambers 20 by means of an induction and charge forming system in a known manner. This system includes an air inlet device 24 that draws atmospheric air from within the protective cowling 11 and delivers it to a plurality of carburetors 26.

In conventional engine practice, the carburetors 26 deliver the fuel/air charge to an intake manifold 27 having a plurality of manifold runners 28, each of which discharge into a respective crank chamber 20 toward the bearings 40 within which the crankshaft 19 is rotatably received. Reed type check valves are positioned in each of the manifold runners 28 so as to preclude reverse flow through the runners 28, as is well known in this art.

The fuel/air charge is compressed in the crank chambers 20 and is transferred upon descent of the pistons 17 into the combustion chambers 22 by transfer or scavenge passages 29 in a known manner.

At the appropriate time, the spark plugs 23 are fired by means of a suitable ignition system. The firing power for the spark plugs 23 is derived from a flywheel magneto 30 affixed to the upper end of the engine output shaft for rotation with it. The fly wheel magneto 30 is typically covered by a cover plate that is affixed to the cylinder block 15 of the engine 13. The flywheel magneto 30 carries a plurality of permanent magneto that cooperate with a charging coil that is affixed to a boss of the cylinder block 15 in proximity thereto. In addition, the flywheel magneto 30 may include generating coils for charging a battery in a known manner.

The power head 10 further includes a steering shaft (not shown) and a steering tiller 35 for steering the drive unit in a known manner. The steering tiller 35 is affixed to a steering head 36 which is connected to the upper end of the power head 10.

The engine 13 further includes an oil seal 38 and an aluminum casing 39 positioned at the upper end of the drive shaft housing 12 where the output shaft is connected to the drive shaft 14 and within which the drive shaft 14 is received.

In the preferred embodiment of the invention, the crankshaft 19 is rotatably received by bearings 40, the details of which are illustrated in FIG. 2.

Referring now to FIG. 2, each bearing 40 includes an inner race 41 and outer race 42. The races 41 and 42 are held in the crankcase by a retainer 50. A plurality of balls 43 are supported between the inner and outer races, 41 and 42 respectively. The balls 43 are also supported by a ring-shaped retainer 51 positioned between the rings 41 and 42 and perpendicular to them. Packed between the inner and outer races 41 and 42 is grease 52. The space between the inner and outer races 41 and 42 respectively is sealed by a seal member 44 so as to prevent corrosion of the bearing 40.

The seal member 44 comprises an annular reinforcing substrate 45 and a rubber layer 46 integrally bonded to the substrate 45. The rubber layer 46 has a lip 47 which has an arrowhead-like cross section protruding from one side of the substrate 45. The lip 47 is in pressure contact with the surface of a stepped portion 48 of the inner race 41 and the retainer 50 to secure the seal member 44 in position.

The foregoing descriptions represent merely exemplary embodiments of the invention. Various changes and modifications may be made without departing from the spirit and scope of the invention as defined by the appended claims.

I claim:

1. In an internal combustion engine comprising a crankcase having at least one crank chamber, at least one bearing, and a crankshaft rotatably journaled within said crankcase and rotatably received by said bearing, the improvement comprising at least one seal member positioned outside of said crank chamber for sealing the inside of said bearing so as to prevent corrosion of said bearing and for preventing the fuel/air mixture within said crank chamber from passing through said bearing to the outside of said crank chamber.

2. In an engine as recited in claim 1, wherein said crankshaft is rotatably journaled within said crankcase to rotate about a generally vertically extending axis.

3. In an engine as recited in claim 2, wherein said bearing further comprises an inner race and outer race.

4. In an engine as recited in claim 3, wherein said bearing further comprises a plurality of balls supported between said inner race and said outer race.

5. In an engine as recited in claim 4, wherein said seal member further comprises an annular reinforcing substrate and a rubber layer integrally bonded to said substrate.

6. In an engine as recited in claim 5, wherein said rubber layer includes a lip having an arrowhead-like cross section protruding from one side of said substrate.

7. In an engine as recited in claim 6, wherein said inner race has a stepped portion and a surface thereof.

8. In an engine as recited in claim 7, wherein said lip is in pressure contact with the surface of the stepped portion of said inner race to secure said seal member in position.

9. In an internal combustion engine comprising a crankcase having a plurality of crank chambers, a plurality of bearings positioned between adjacent crank chambers, and a crankshaft rotatably journaled within said crankcase and rotatably received by said bearings, the improvement comprising a plurality of seal members one associated with each of the bearings for sealing the inside of each bearing so as to prevent corrosion of said bearings and for sealing said crank chambers from each other.

10. In an engine as recited in claim 9, wherein said crankshaft is rotatably journaled within said crankcase to rotate about a generally extending vertical axis.

11. In an engine as recited in claim 10, wherein each of said bearings further comprises an inner race and outer race.

12. In an engine as recited in claim 11, wherein each of said bearings further comprises a plurality of balls supported between said inner and outer races.

13. In an engine as recited in claim 12, wherein each of said seal members further comprises an annular reinforcing substrate and a rubber layer integrally bonded to said substrate.

14. In an engine as recited in claim 13, wherein said rubber layer includes a lip having an arrowhead-like cross section protruding from one side of said substrate.

15. In an engine as recited in claim 14, wherein said inner race has a stepped portion and a surface thereof.

16. In an engine as recited in claim 15, wherein said lip is in pressure contact with the surface of the stepped portion of said inner race to secure said seal member in position.

17. In an engine as recited in claim 1, wherein the engine is a marine engine and wherein said seal member seals said bearing from moisture in said crankcase so as to prevent corrosion of said bearing.

18. In an engine as recited in claim 2, wherein said seal member is positioned at the bottom of said crankcase so as to protect said bearing from moisture at the bottom of said crankcase.

19. A bearing structure in an internal combustion engine comprising a crankcase having at least two adjacent crank chambers, at least one bearing, a crankshaft rotatably journaled within said crankcase to rotate about a generally vertically extending axis and rotatably received by said bearing, and at least one seal member for sealing the inside of said bearing and positioned between two adjacent crank chambers for sealing said crank chambers from each other so that said engine is more compact in the vertical dimension.

* * * * *